US012763450B2

(12) United States Patent
Babamir

(10) Patent No.: US 12,763,450 B2
(45) Date of Patent: Oct. 13, 2026

(54) SYSTEMS FOR AND METHODS OF SIGNAL DIVISION

(71) Applicant: Avago Technologies International Sales Pte. Limited, Singapore (SG)

(72) Inventor: Seyed Mehrdad Babamir, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 161 days.

(21) Appl. No.: 18/494,481

(22) Filed: Oct. 25, 2023

(65) Prior Publication Data

US 2025/0141079 A1 May 1, 2025

(51) Int. Cl.
*H01P 5/16* (2006.01)
*H04B 1/40* (2015.01)

(52) U.S. Cl.
CPC . *H01P 5/16* (2013.01); *H04B 1/40* (2013.01)

(58) Field of Classification Search
CPC .............. H01P 5/16; H04B 1/40; H03H 7/422
See application file for complete search history.

(56) References Cited

U.S. PATENT DOCUMENTS

| | | | | |
|---|---|---|---|---|
| 5,469,129 | A * | 11/1995 | Dydyk | H03H 7/48 333/100 |
| 9,270,007 | B2 | 2/2016 | Ju | |
| 9,413,414 | B2 | 8/2016 | Knox | |
| 10,608,313 | B2 | 3/2020 | Wang et al. | |
| 11,626,854 | B2 | 4/2023 | Hosagavi Puttaraju et al. | |
| 12,119,825 | B2 * | 10/2024 | Bao | H03K 17/6871 |
| 2007/0096842 | A1 * | 5/2007 | Hyun | H03H 7/52 333/1.1 |
| 2015/0002243 | A1 | 1/2015 | Darwish et al. | |
| 2017/0077892 | A1 | 3/2017 | Thorup | |

FOREIGN PATENT DOCUMENTS

| | | | | |
|---|---|---|---|---|
| CN | 102544675 | A * | 7/2012 | |
| CN | 103390786 | | 11/2013 | |
| CN | 104319449 | | 1/2015 | |
| CN | 110931932 | | 3/2020 | |
| CN | 111834726 | | 10/2020 | |
| CN | 113708731 | | 11/2021 | |
| CN | 111261990 | B | 12/2021 | |
| CN | 114914653 | A | 4/2022 | |
| KR | 100529581 | B1 | 11/2005 | |
| WO | WO-2005125008 | A1 * | 12/2005 | H03H 9/0023 |

OTHER PUBLICATIONS

Jarjar Mariem et al "Three branch microwave channelized active bandpass filter", 2019, International conference on wireless networks and mobile communications (WINCOM), IEEE, Oct. 20, 2019 pp. 1-5 (Year: 2019).*

* cited by examiner

*Primary Examiner* — Andrea Lindgren Baltzell
*Assistant Examiner* — Kimberly E Glenn
(74) *Attorney, Agent, or Firm* — Foley & Lardner LLP

(57) ABSTRACT

Wide-band output isolation is provided. A device includes a first output for a first radio frequency (RF) signal. A device includes a second output for a second RF signal. The device includes a first transistor having a first source/drain. The device includes a second transistor having a first source/drain, wherein the first source/drain of the first transistor is coupled to the first source/drain of the second transistor and wherein the first and second transistors are disposed between the first output and the second output.

17 Claims, 8 Drawing Sheets

SYSTEMS FOR AND METHODS OF SIGNAL DIVISION

FIELD OF THE DISCLOSURE

This disclosure generally relates to systems and methods for signal division or splitting. The disclosure also relates to a circuit or method which is employed to provide signal division, including but not limited to signal division with enhanced isolation while maintaining input/output impedance matching.

BACKGROUND

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use communication networks. Furthermore, digital and radio frequency (RF) circuit fabrication improvements, as well as advances in circuit integration and other aspects have made equipment smaller, cheaper, and more reliable. Communication can utilize receivers that operate in accordance with various standards such as IEEE 802.11x, Bluetooth, global system for mobile communications (GSM), code division multiple access (CDMA). In some applications, a receiver may include a signal divider or power divider that receives a signal and provides two output signals for processing. Such processing can operate on the output signals across various standards, protocols, power levels, frequencies, and so forth.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
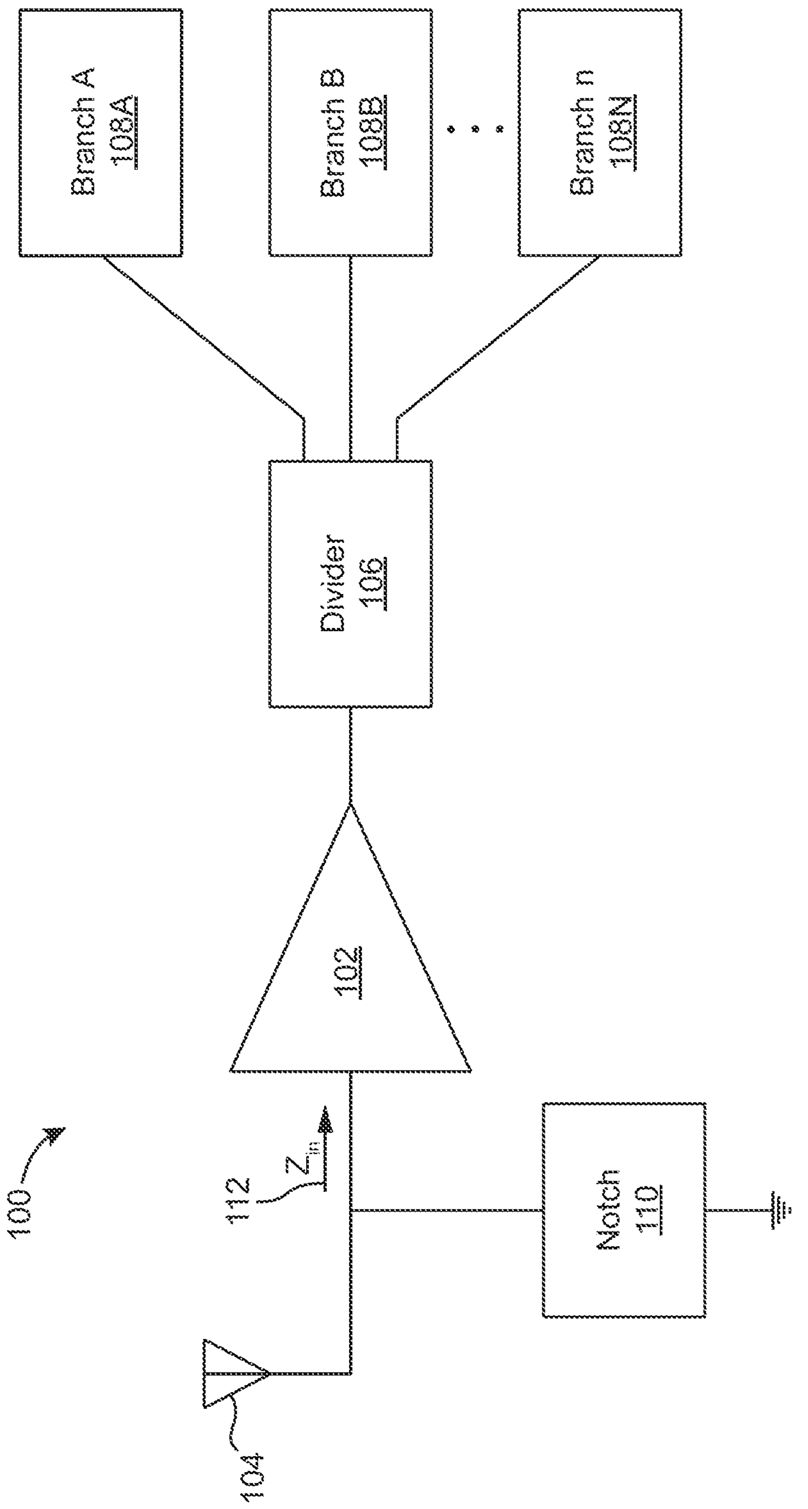
FIG. 1 is a schematic block diagram of a radio frequency amplification circuit including a divider circuit, according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Systems and methods provide for N-way division of a signal where N is an integer in some embodiments. In some embodiments, an N-way power divider can be matched to any arbitrary input and output impedances, can provide arbitrary power division ratios ($S_{21}$, $S_{31}$, . . . ), and can have an arbitrary number of branches. Although described below with respect to a radio frequency (RF) circuit, the systems and methods can be used in other applications and are not limited to RF applications unless explicitly recited in the claims. In some embodiments, the systems and methods provide power division with enhanced isolation. A power divider with enhanced isolation also serves as matching network in some embodiments.

In some embodiments, a power divider or splitter is used in receivers or front end modules (FEMs) that support multiple standards (e.g., standards such as IEEE 802.11x, Bluetooth, global system for mobile communications (GSM), code division multiple access (CDMA), 5G, 6G, LTE, etc.) at the same time or near simultaneously. In some embodiments, the power divider can be used in any product that needs to accommodate coexistence of multiple standards in a wide bandwidth (e.g., products that need to support WiFi and cellular standards at the same time). The power divider is configured to provide multiple outputs, one for each standard in some embodiments. In some embodiments, a power divider is matched to its preceding low noise amplifier (LNA) and following circuits or blocks to avoid a drop in receiver gain. In some embodiments, the power divider is configured to provide sufficient isolation between outputs over their bandwidth. In some embodiments, the power divider is configured to avoid drawbacks associated with conventional Wilkinson power dividers.

Some embodiments disclosed herein are related to a power divider device. The power divider device includes a first node configured to receive a first signal, a second node configured to provide a second signal, and a third node configured to provide a third signal. The power divider device includes an inductive element coupled between the first node and ground, a a capacitive element coupled between the first node and a fourth node, a first T network coupled between the fourth node and the second node, and a second T network coupled between the third node and the fourth node. The first T network includes a first capacitor having a capacitance related to a power division ratio between the first node and the second node and a first value, and the second T network includes a second capacitor having a capacitance related to a power division ratio between the first node and the third node and the first value.

In some embodiments, the first T network includes a first inductor having an inductance related to the power division ratio between the first node and the second node and the second T network includes a second inductor having an inductance related to the power division ratio between the first node and the third node. In some embodiments, the first T network includes a third inductor having an inductance related to the power division ratio between the first node and the second node, and the second T network includes a fourth inductor having an inductance related to the power division ratio between the first node and the third node. In some embodiments, the first T network includes a third capacitor having capacitance related to the power division ratio between the first node and the second node, and the second T network includes a fourth capacitor having a capacitance related to the power division ratio between the first node and the third node. In some embodiments, the first T network includes a first inductor having an inductance related to the power division ratio between the first node and the second node, the second T network comprises a second inductor having an inductance related to the power division ratio between the first node and the third node, the first T network includes a third inductor having an inductance related to the power division ratio between the first node and the second node and the second T network includes a fourth inductor having an inductance related to the power division ratio between the first node and the third node, and the first T network includes a third capacitor having capacitance related to the power division ratio between the first node and the second node and the second T network comprises a fourth capacitor having an capacitance related to the power division ratio between the first node and the third node.

In some embodiments, the power divider device also includes a fifth node configured to provide a fourth signal, and a third T network coupled between the fifth node and the fourth node. The third T network includes a third capacitor having a capacitance related to a power division ratio between the first node and the fifth node. In some embodiments, the first capacitor has a capacitance of $C_2|S_{21}|^2$, where $C_2$ is a capacitance value and $|S_{21}|^2$ is a s square of the power division ratio between the first node and the second node. In some embodiments, wherein the first inductor has an inductance of $L_2|S_{21}|^2$ where $L_2$ is an inductance value and $|S_{21}|^2$ is a square of the power division ratio between the first node and the second node. In some embodiments, an amplifier is coupled to the first node. In some embodiments, the capacitive element has a capacitance of $1/(1/C_1-1/C_2)$ where $C_1$ and $C_2$ are capacitance values derived from an impedance matching network.

Some embodiments disclosed herein are related to a power divider device. The power divider device includes a first node configured to receive a first signal, a second node configured to provide a second signal, and a third node configured to provide a third signal. The power divider device also includes an inductive element coupled between the first node and a power or ground node. The power divider device also includes a capacitive element coupled between the first node and a fourth node, a first network coupled between the fourth node and the second node, and a second network coupled between the third node and the fourth node. The second node is coupled to a first load, and the third node is coupled to a second load, The first load has an impedance related to a power division ratio between the first node and the second node and a first value, and the second load has an impedance related to a power division ratio between the first node and the third node and the first value.

In some embodiments, a circuit is provided between the second node and the third node. In some embodiments, the circuit comprises an inductor and a capacitor. In some embodiments, the inductor and the capacitor are in series. In some embodiments, the first network includes a first inductor having an inductance related to the power division ratio between the first node and the second node, and the second network includes a second inductor having an inductance related to the power division ratio between the first node and the third node. In some embodiments, the first network includes a third inductor having an inductance related to the power division ratio between the first node and the second node, and the second network includes a fourth inductor having an inductance related to the power division ratio between the first node and the third node.

In some embodiments, the first network includes a first capacitor having a capacitance related to the power division ratio between the first node and the second node and the second network comprises a second capacitor having a capacitance related to the power division ratio between the first node and the third node. The first network includes a third capacitor having capacitance related to the power division ratio between the first node and the second node, and the second network comprises a fourth capacitor having an capacitance related to the power division ratio between the first node and the third node.

In some embodiments, the power divider device also includes a fifth node configured to provide a third signal. The fifth node is coupled to a third load, wherein the third load has an impedance related to a power division ratio between the first node and the fifth node.

Some embodiments relate to a method. The method includes receiving at a first node a first signal, and providing the first signal to a second node. The second node is coupled to a first network, and the first network includes a first capacitor and a first inductor. The first capacitor is disposed between the first node and the second node. The method also includes providing a second signal from a second network to a third node. The second network is coupled to the first capacitor and the third node. The second network includes a second capacitor and a third capacitor coupled in series and a second inductor coupled between the second capacitor and the third capacitor. The method also includes providing a third signal from a third network to a fourth node. The third network is coupled to the first capacitor and the fourth node. The third network includes a fourth capacitor and a fifth capacitor coupled in series and a third inductor coupled between the fourth capacitor and the fifth capacitor. The second inductor has an inductance related to a power division ratio between the first node and the second node and a first value, and the third inductor has an inductance related to a power division ratio between the first node and the third node and the first value.

In some embodiments, the method also includes providing a fourth signal across an inductive and resistive path between the second node and the third node.

An amplifier, such as a low noise amplifier for an RF circuit can supply one or more output signals to one or more devices via corresponding output ports for the amplifier. For example, an antenna can receive signals for any number of communication protocols (e.g., Wi-Fi, Cellular, Bluetooth, or so forth) and provide the aggregates signals to an amplifier for amplification. The amplifier can generate outputs corresponding with the various communication protocols, bands thereof, or other signals. The outputs of the amplifier can receive interference or other signals, such as via direct coupling from a device at the output, inductive coupling along a PCB trace, cabling, or other like. Further, some outputs can include different spectral content, relative to the other outputs. Achieving isolation between the various output ports can avoid mutual interference, increase a signal to noise ratio of the various output signals, or otherwise aid in the conveyance of the various output signals.

For clarity of the disclosure, before proceeding with further description of the systems and methods provided herein, illustrative descriptions of various terms are provided below.

An output of a device may refer to or include a port (e.g., terminal) for an output signal generated by (e.g., transformed by) the device or a terminal to provide the output signal, in some embodiments. The output signal can include an amplified signal of an amplifier device. For example, a voltage or frequency can be amplified, relative to an input signal along at least a portion of a frequency spectrum. The terminal may refer to or include an element configured to couple the device to another device (e.g., outsider or within an IC), to transfer a signal. For example, an electrical terminal can include a conductive element electrically coupled with a device connected to the output, such as a power divider connected to one or more further outputs. To continue the example, an output terminal for a radio frequency (RF) signal can be configured to pass signals at the radio frequency. A radio frequency (RF) signal may refer to or include a signal including one or more components in the RF range, which can extend from a kilohertz range to a GHz range (e.g., into the hundreds of GHz), in some embodiments. An RF signal may occupy bandwidth across a frequency range. A center frequency of a signal may refer to or include a spectral midpoint thereof, in some embodiments. For example, a signal extending from 2,427 MHz to 2,447 MHz as associated with a center frequency of 2,437 MHZ.

A power divider or power divider device may refer to or include a device which receives an input signal and generates two or more output signals in some embodiments. The output signals can be provided with a same or same or different power, frequency range, or other attributes. Power dividers can utilize resistive, capacitive, and/or inductive networks in some embodiments.

Isolation can refer to or include a degree to which output ports are decoupled from each other, in some embodiments. For example, the isolation can be quantized as a measure of a portion of one port which is measurable at another port. Greater isolation refers to ports which are more isolated (e.g., having a smaller magnitude of a signal measurable at another port), corresponding to a numerically smaller number. For example, two ports which are isolated at −30 dB exhibit greater isolation than two ports which are isolated at −20 dB.

A T filter or T network may refer to or include a circuit having a series arm and a shunt arm, according to some embodiments. The series arm is generally depicted as a horizontal portion of a tee filter or network, and the shunt arm is generally depicted as the vertical portion of the tee filter or T network. The series arm can include capacitors, inductors, or other filtering elements. The shunt arm can include capacitors, inductors, or other filtering elements The shunt arm can be connected along the series arm (e.g., at a mid point) to connect to a voltage, such as ground or a bias voltage. A parameter of the T filter can refer to or include a characteristic impedance, propagation velocity, attenuation, phase shift, voltage standing wave ration (VSWR), capacitance, inductance, resistance, or so forth, according to some embodiments. An amplifier may refer to a device that provides a gain to a signal in some embodiments. A low noise amplifier may refer to an amplifier that amplifies a very low-power signal without significantly degrading its signal-to-noise ratio in some embodiments.

A node may refer to or include a point on a circuit where two or more circuit elements are connected together in some embodiments. For example, a connection between a power plane (e.g., a ground plane) and a passive or active component or between two or more passive or active components may be referred to as a voltage or ground node.

FIG. 1 depicts a schematic block diagram of a radio frequency amplification circuit 100, according to some embodiments. The circuit 100 can be configured to operate along various frequency bands. Circuit 100 can be a front end module or circuit in some embodiments. For example, the circuit 100 can operate across various bands of a wireless protocol such as a wireless fidelity (Wi-Fi) protocol, or across various wireless protocols such as cellular (e.g., 5G, 6G, etc.), 802.11 Wi-Fi, Bluetooth, Zigby and so forth. The circuit 100 can include a low-noise amplifier (LNA) 102 configured to receive a signal from an input port such as an antenna 104 or more than one antenna. The signal can include content distributed across one or more channels, such as channels exhibiting spectral diversity. For example, the antenna 104 can be a wideband antenna configured to receive various signals, such as Wi-Fi signals in a five or six GHz band (e.g., between 5.15-7.125 GHZ), in a 2.4 GHz band (e.g., 2.4-2.5 GHZ), or other signals such as Bluetooth content (e.g., in a 2.4-2.49 GHz range), cellular telephone signals, or so forth.

The amplifier 102 can output a signal to one or more devices, branches, or processing paths (or terminals configured to connect to further devices). For example, the amplifier 102 is coupled to a splitter or divider 106 to connect to multiple branches 108A, 108B, . . . 108N or to convey multiple bands or signals. The multiple branches 108A, 108B, . . . 108N can be coupled to processing paths in a single device (e.g., receiver) or to multiple devices. The difference in frequency of operation between branches 108A, 108B, . . . 108N can extend beyond other approaches, such as greater than 1.5 GHz, to operate with 5 GHz and 6 GHz Wi-Fi bands, or greater than 4 GHz to operate with further 2.4 GHz bands of Wi-Fi or Bluetooth systems in some embodiments. Divider 106 is a power divider or power splitter configured to provide two or more output signals divided from the signal provided by amplifier 102. Divider 106 can be a passive device and can be a directional coupler or a hybrid coupler in some embodiments.

The circuit 100 can be implemented on or include one or more silicon dies, multi-die packages, circuit boards, or the like. Circuit 100 can be provided in a single chip integrated circuit (IC) package or a multi-chip module.

Amplifier 102 can include a common transistor, embodied as a first stage of a cascode circuit common to two or more outputs. A first source/drain of the common transistor is connected to a reference voltage (e.g., a ground). In various embodiments, the reference voltage can include various other voltage levels, such as to bias the circuit 100 output upward or downward. A second source/drain of the common transistor connects to any number of outputs of the circuit 100.

The antenna 104 can receive various incidental signals or interference, such as wireless transmissions from radar systems, cordless phones, powerline interference (e.g., fifty or sixty Hz), and so forth. A filter (e.g., the depicted notch filter 110) can be configured to pass a band select frequency range corresponding to a bandwidth of the amplifier 102. The input impedance 112 to the amplifier 102 can vary over frequency, according to the frequency response of the notch filter 110. For a frequency of interest, the notch filter 110 can be adjusted to increase an input impedance thereto. However, the adjustments may be targeted to a center frequency of operation, wherein the wideband operation can exceed a band rejection of the notch filter 110. The divider 106 (e.g., power divider) can include inter-output isolation between the wide-band outputs.

In various embodiments, the circuit 100 can include a third, fourth, fifth, or further outputs provided in parallel to the depicted outputs for branches 108A, 108B, . . . 108N, where N is an integer. The various outputs may be configured to operate with signals having different frequencies (e.g., center frequencies, such as in the case of a combination of one or more Wi-Fi, Bluetooth, Cellular or other protocols) or be the same frequency. Some frequencies can include various channels of communication protocols varying between 900 MHZ, 2.4 GHZ, 5 GHz, 6 GHZ, etc. That is, the center frequency of the various signals can vary by more than 1 GHz, such as 1.5 GHz, 4 GHZ, or so forth. Moreover, the various output signals can couple to further devices, wherein the further devices can couple various signals (e.g., interfering signals) into the outputs such that isolating the outputs can improve a bit rate error, throughput, or other characteristic of the circuit 100, or a network including the circuit 100. For example, the various outputs can connect, via cables, conductive traces, or other connectors, which may directly or inductively couple into the outputs (e.g., along the signal conductors, shields, etc.).

Figure 2:
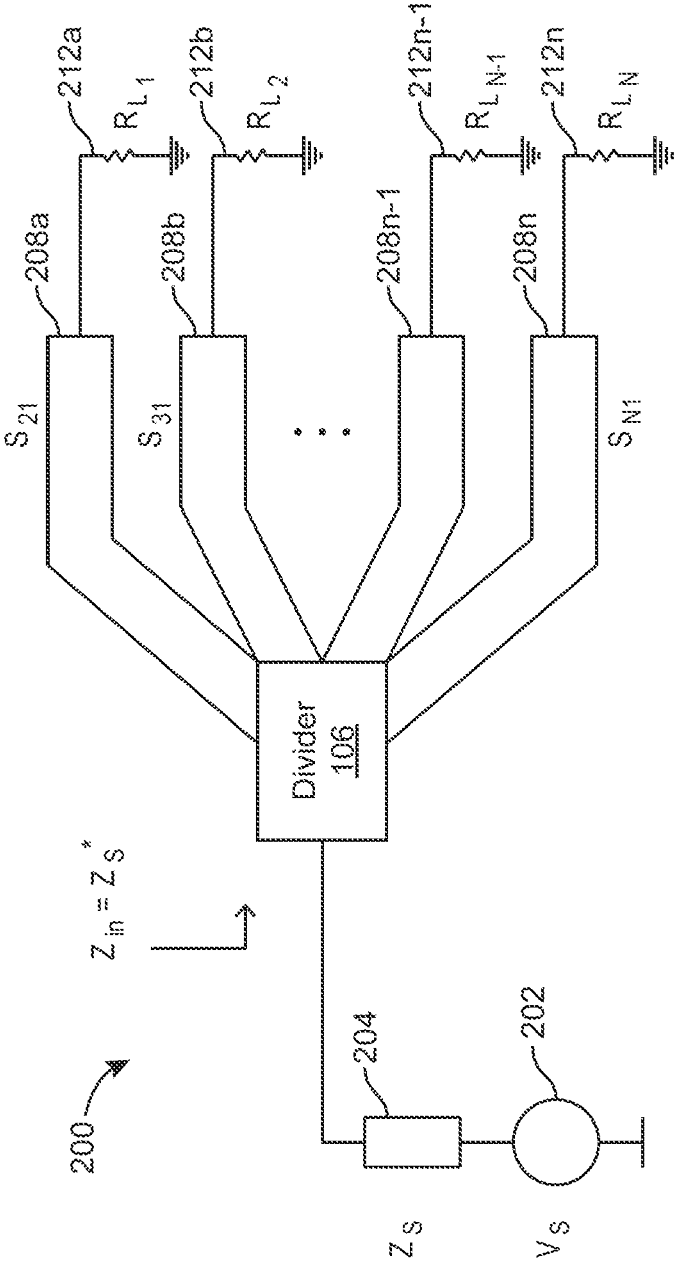
FIG. 2 is a more detailed schematic block diagram of a divider circuit for use in the radio frequency amplification circuit illustrated in FIG. 1, according to some embodiments.

Referring now to FIG. 2, a circuit 200 can be used as part of circuit 100 discussed in FIG. 1 or as part of other devices, according to some embodiments. The schematic block diagrams of FIGS. 1-8 are provided as a functional schematic, and do not necessarily correlate to a physical placement of any particular component. Further, although particular components are referred to as constituent to the amplifier, or an output associated therewith, such categorizations are merely descriptive according to the depictions provided herein.

Circuit 200 includes a source 202 (e.g., a voltage source $V_s$), a source impedance 204 (e.g., $Z_s$), a divider 106, and branches 208*a*, 208*b*, . . . 208*n*-1, 208*n*. The source impedance is arbitrary in some embodiments. Each branch 208*a*, 208*b*, . . . 208*n*-1, 208*n* is coupled to a respective load 212*a*, 212*b*, . . . 212*n*-1, 2212*n*. Loads 212*a*, 212*b*, . . . 212*n*-1, 2212*n* can be impedance loads (e.g., resistive loads), that represent other circuits or processing paths in some embodiments. The impedance loads are arbitrary in some embodiments. A load may refer to a device or component that consumes electrical power from a circuit in some embodiments. The load can be the part of a circuit that operates, performs a specific function, or utilizes the electrical energy provided by the power source. The load can vary widely depending on the application and can include various devices and components such as resistors, processors, converters, filters, etc.

Each branch 208*a*, 208*b*, . . . 208*n*-1, 208*n* has an arbitrary power division ratio (e.g., $S_{21}$, $S_{31}$, . . . . $S_{(n-1)1}$, $S_{n1}$, respectively). The power division ratios are not equal in some embodiments. In some embodiments, the sum of the power division ratios equals 1 (e.g., $|S_{21}|^2+|S_{31}|^2$ . . . $+|S_{(n-1)1}|^2+|S_{n1}|^2=1$). In some embodiments, the power division ratio is $|S_{n1}|^2$.

The input impedance (e.g., $Z_{in}$) of divider 106 has a value equal to the complex conjugate of the source impedance (e.g., $Z_s^*$) in some embodiments. The source 202 is a current source in some embodiments. The source impedance can be a resistive, capacitive, inductive or combination thereof impedance. In some embodiments, other choices of the input impedance are possible in view of design criteria and system parameters. Th input impedance does not have to be equal to the complex conjugate of the source impedance (e.g., $Z_s^*$).

Figure 3:
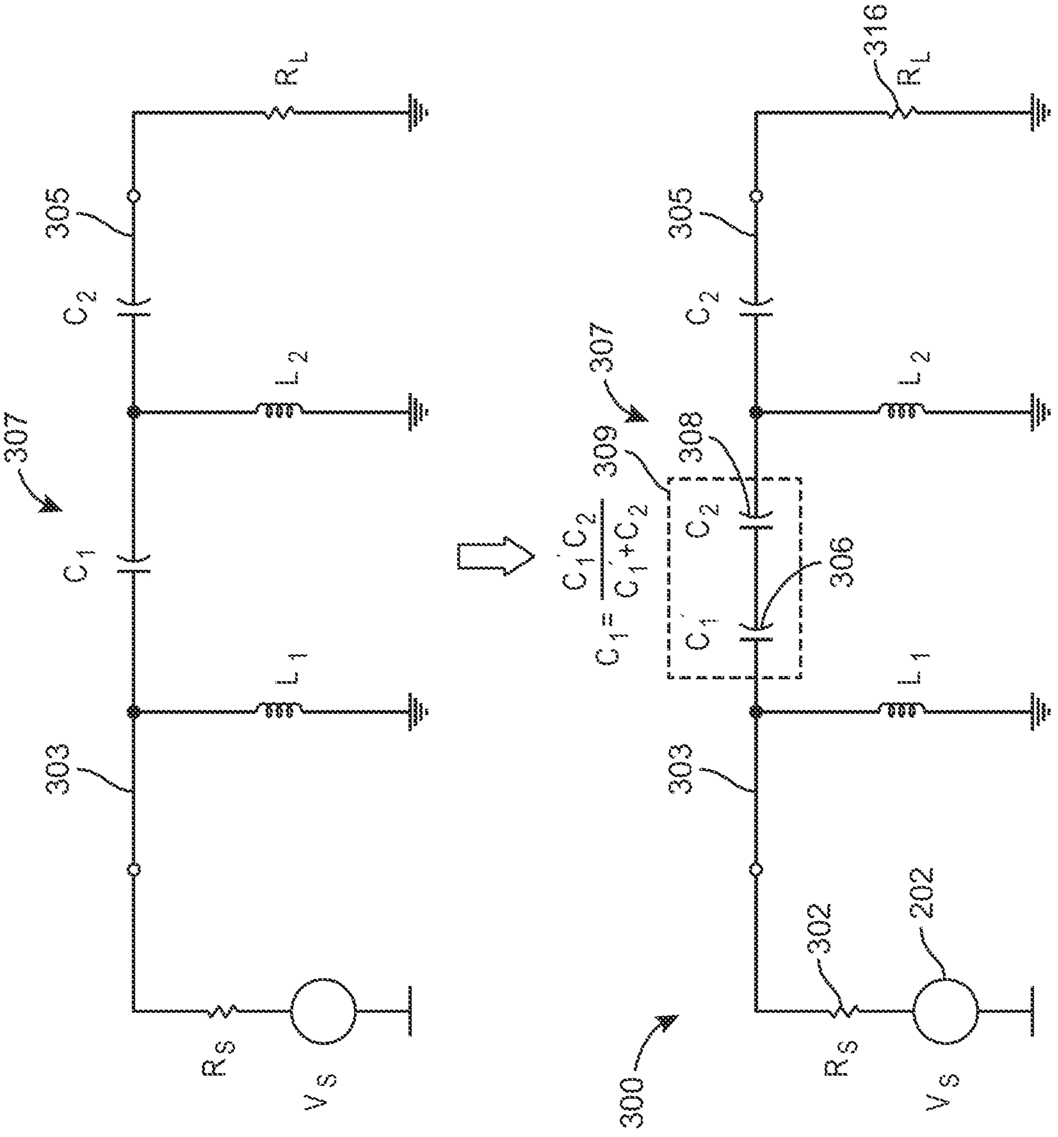
FIG. 3 is a more detailed schematic block diagram of a portion of the divider circuit illustrated in FIG. 2 for use in the radio frequency amplification circuit illustrated in FIG. 1, according to some embodiments.

With reference to FIG. 3, a circuit 300 is provided for a two step matching network. Circuit 300 is discussed below for determining input impedance associated with divider 106 (FIG. 2). The input impedance at node 303 is matched to a source impedance 302 (e.g., port 1) associated with source 202 (e.g., $R_s$, the output impedance of the previous circuit or block). Circuit 300 includes a network 307 between node 303 and an output node 305. Network 307 includes a capacitor $C_1'$, a capacitor $C_2$, an inductor $L_1$, and an inductor $L_2$. An impedance load 316 (e.g., $R_L$) is coupled to node 305. A capacitive network 309 (representing capacitance $C_1$ is disposed between inductors $L_1$ and $L_2$ which are each coupled to ground. The values of capacitor $C_1$, capacitor $C_2$, inductor $L_1$, and inductor $L_2$ can be calculated to match the source impedance 302 for a particular load $R_L$. Capacitors $C_1$ and $C_2$ and inductors $L_1$ and $L_2$ have values chosen in accordance with an impedance matching network. An impedance matching network may refer to an electrical circuit or device used to ensure that the impedance of a source matches the impedance of a load. An example impedance matching network with capacitor $C_1$, capacitor $C_2$, inductor L1, and inductor L2 between nodes 303 and 305 is shown in FIG. 1. The source impedance Rs can be impedance Zs in some embodiments. In some embodiments, source impedance 32 can be 200 ohms with zero reactance, $R_L$ can be 16.67 ohms with zero reactance, the frequency can be 6 GHZ, $L_1$ has a value of 3.337 nanohenries (nH), $L_2$ has a value of 0.975 nH, $C_1$ has a value of 0.292 picofarads (pF), and $C_2$ has a value of 1.01 pF.

Capacitive network 309 includes capacitors $C_1'$ and $C_2$ which are coupled in series. The capacitance of capacitor $C_1'$ is equal to $1/(1/C_1-1/C_2)$. Capacitive network 309 is a single capacitive component having a value of $1/(1/C_1'+1/C_2)$ in some embodiments. In some embodiments, capacitive network 309 includes more than two capacitive components having a value of $1/(1/C_1'+1/C_2)$ in some embodiments.

Figure 4:
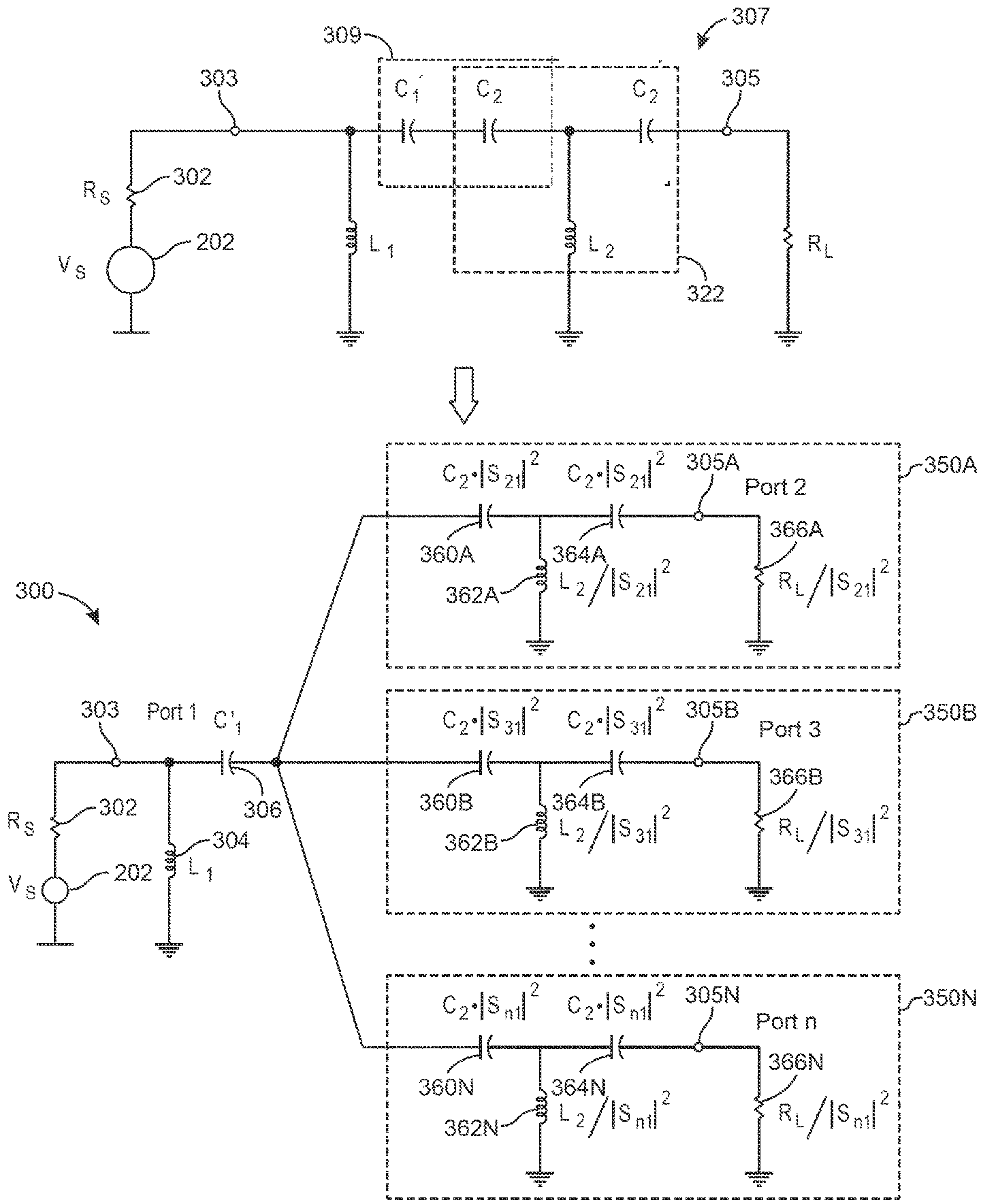
FIG. 4 is a more detailed schematic block diagram of the divider circuit illustrated in FIG. 2 for use in the radio frequency amplification circuit illustrated in FIG. 1, according to some embodiments.

With reference to FIG. 4, a network 322 is split into N branches 350A, 350B . . . 350N, while maintaining the same input impedance and hence, input matching according to some embodiments. Branches 350A-N can serve as branches 208A-N in FIG. 2. Branches 350A-N include loads 366A-N (e.g., loads 212A-N) in FIG. 2 in some embodiments. Loads 366A-N are coupled to nodes 305A-N, respectively. Network 322 is a $C_2$-$L_2$-$C_2$ T network where inductor $L_2$ is coupled between capacitors $C_2$ and ground in some embodiments. Branch 350A includes a capacitor 360A having a capacitance of $C_2|S_{21}|^2$, an inductor 362B having a value of $L_2/|S_{21}|^2$, capacitor 364A having a capacitance of $C_2|S_{21}|^2$, and a load 366A of $R_L/|S_{21}|^2$ in some embodiments. Branch 350B includes a capacitor 360B having a capacitance of $C_2|S_{31}|^2$, an inductor 362B having a value of $L_2/|S_{31}|^2$, capacitor 364B having a capacitance of $C_2|S_{31}|^2$, and a load 366B of $R_L/|S_{31}|^2$ in some embodiments. The capacitance, inductor and load values can be calculated for other branches according to the same pattern in some embodiments. $|S_{n1}|^2$ is the power division ratio between a first port (port 1) and nth port, where n is equal to 2 for the first branch (e.g., branch 350A) and corresponds to node 305A, is equal to 3 for the second branch (e.g., branch 350B) and corresponds to node 305B, etc. in some embodiments. A power division ratio may refer to a comparison of power between two nodes in some embodiments. The power division ratio is a quotient of power between an input node and an output node in some embodiments.

Figure 5:
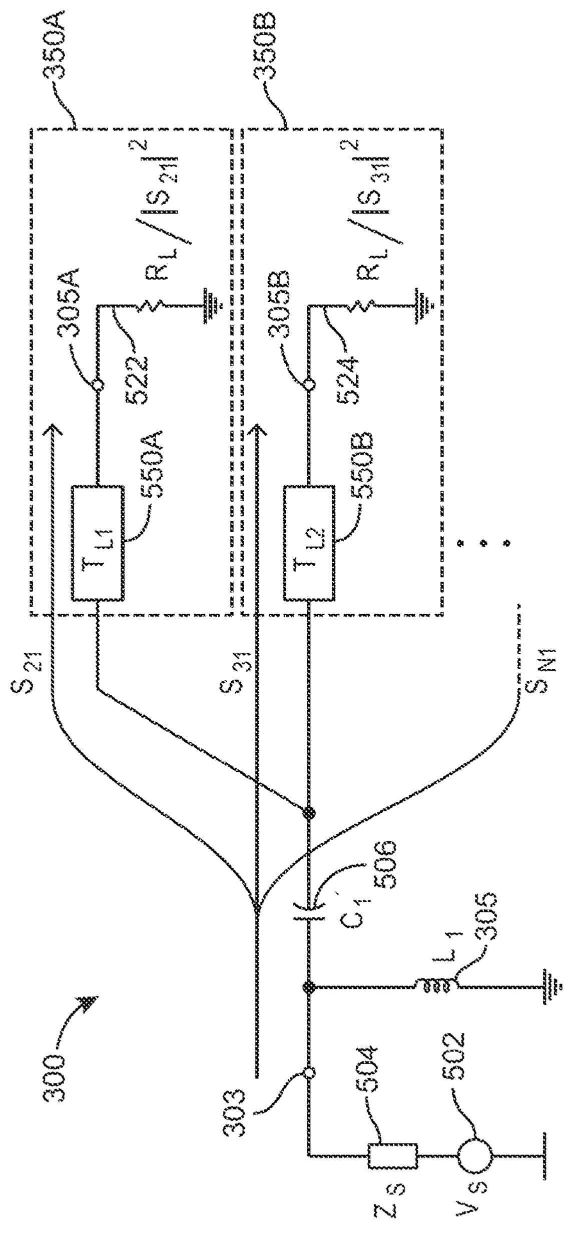
FIG. 5 is a more detailed schematic block diagram of a divider circuit illustrated in FIG. 2 for use in the radio frequency amplification circuit illustrated in FIG. 1, according to some embodiments.
Figure 6:
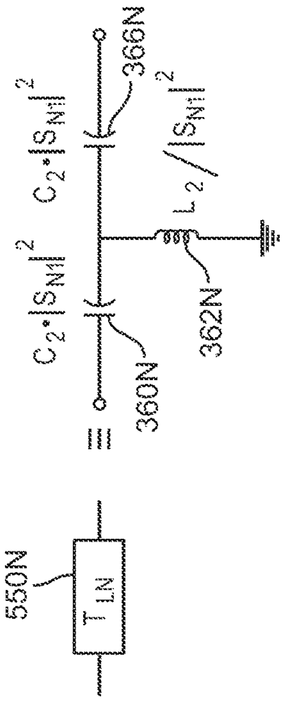
FIG. 6 is a more detailed schematic block diagram of a branch circuit for the divider circuit illustrated in FIG. 5, according to some embodiments.

With reference to FIGS. 5 and 6, the loads 366A and 366B can be calculated using power division ratios. In FIG. 4, the loads 366A and 366B can be calculated using power division ratios in some embodiments. For example, in a 3-way power divider with $|S_{21}|$, $|S_{31}|$, and $|S_{41}|$ equal to −5 decibels (dBs) or 1/SQR(3) and -desired loads for loads 366A, 366B, and 366C equal to 50 ohm (e.g., $R_L/|S_{n1}|^2$), $R_L$ would equal 50/3 ohms. If the desired source impedance is 200 ohms, the initial matching network between nodes 303 and 305 is set to convert the source impedance of 200 ohms to load $R_L$ or 50/3 ohms. Since the initial design is matched to the source impedance and the load $R_L$, the circuit 300 is matched to the source impedance $Z_s$ and load $R_L$ as discussed above. Transmission line or branch circuit 550A, 550B . . . 550N can have arbitrary power division ratios $|S_{21}|^2$, $|S_{31}|^2$ . . . $|S_{n1}|^2$.

In some embodiments, a transmission line realization instead of a lumped (T-network) realization can be utilized. For high-frequency applications (tens or hundreds of GHz), it would be beneficial for area purposes to replace the T-networks with their transmission line counterparts (FIG. 5), with the characteristic impedance ($Z_0$), electrical length (L), and resonance frequency ($f_0$) shown in FIG. 6. In some embodiments, L is 90 degrees, $f_0$=1/(2Π(SQR($L_2C_2$) and $Z_0$=SQR($L_2/C_2$)/($|S_{n1}|$)$^2$ for a transmission line $T_{LN}$.

Figure 7:
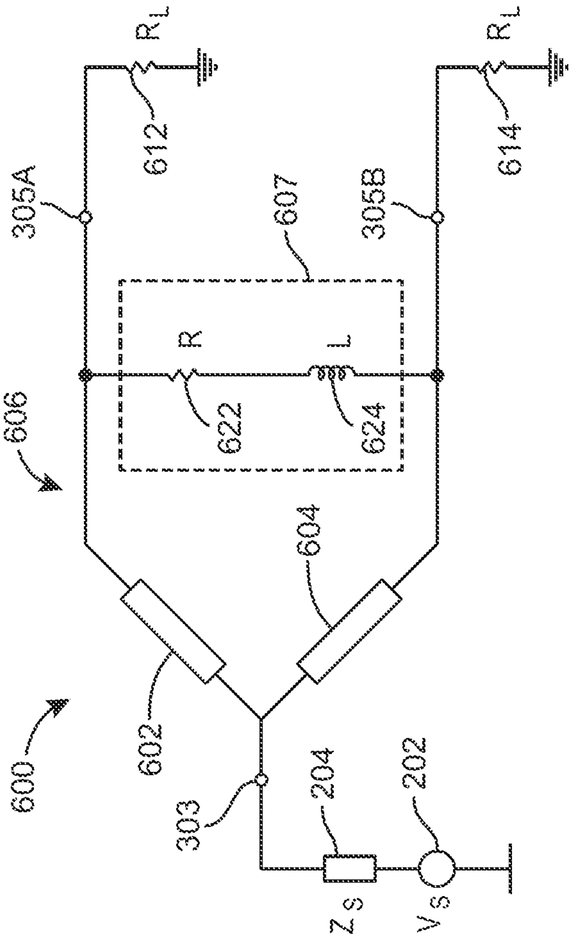
FIG. 7 is a more detailed schematic block diagram of a divider circuit for use in the radio frequency amplification circuit illustrated in FIG. 1, according to some embodiments.

With reference to FIG. 7, a circuit 600 includes source 202 (e.g., an LNA), source impedance 204, and a divider 606. Divider 606 is a 2 way divider and includes a branch 602 coupled to a load 612 and a branch 604 coupled to a load 614. An inductor L1 and a capacitor C1 can be coupled to node 303 in FIG. 7 as shown in FIG. 3 in some embodiments. A resistor inductor network 607 is coupled between nodes 605A and 605B. Network 607 provides enhanced isolation between nodes. In some embodiments, the isolation is enhanced over s solely resistive connection between nodes 305A and 305B. Branches 602 and 604 can include a T network such as network 307 (FIG. 2) in some embodiments. Any arbitrary passive network (e.g., containing R, L, C, and K (mutual inductance)) can be utilized for network 607. The series R-L network shown in FIG. 7 is an exemplary network 607.

Figure 8:
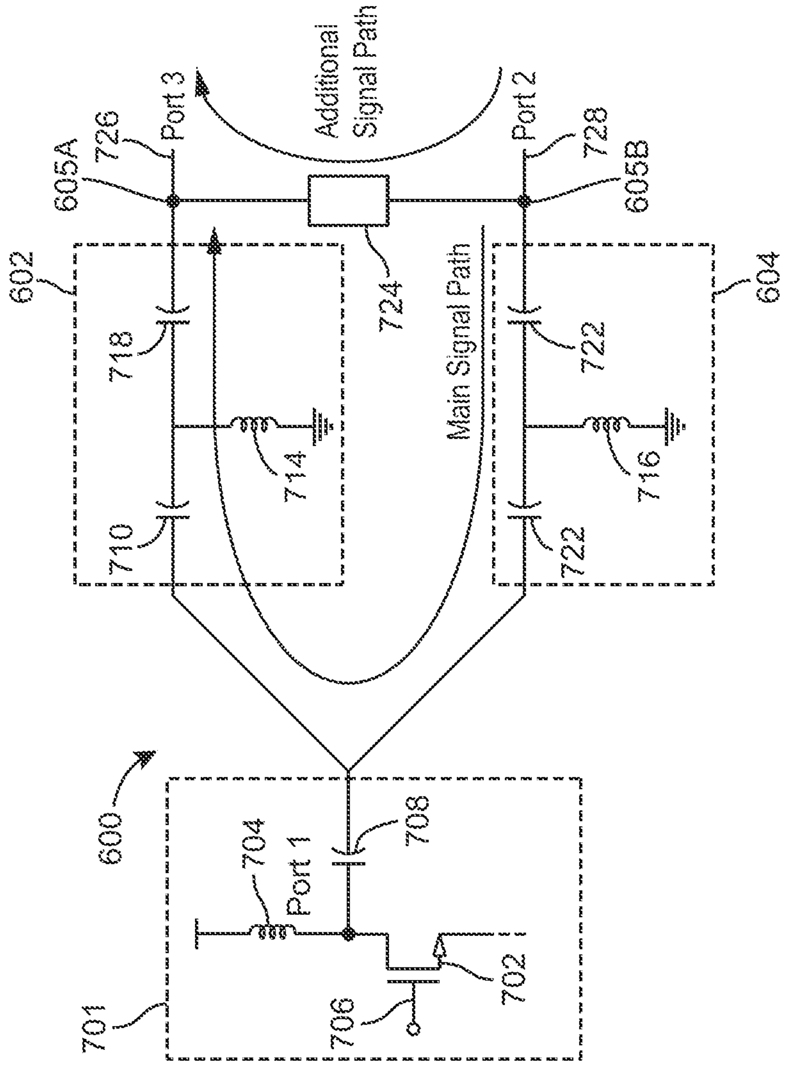
FIG. 8 is a more detailed schematic block diagram of a divider circuit for use in the radio frequency amplification circuit illustrated in FIG. 1, according to some embodiments.

With reference to FIG. 8, a circuit 701 associated with source 202 and source impedance 204 (FIG. 1) includes a transistor 702, and an inductor 704, and a capacitor 708. Inductor 704 can be a component like inductor L1 in FIG. 3. Capacitor 708 can be a component like capacitor 506 discussed above with reference to FIG. 5. Branch 602 includes a T network including a capacitor 710, a capacitor 718, and an inductor 714. Branch 604 includes a T network including a capacitor 722, a capacitor 738, and an inductor 716. Branch 602 is similar to branch 350A, and branch 604 is similar to branch 350B in some embodiments. A signal path 724 connects nodes 726 and 728 and provides an additional path that directs the signal to the other node or port with opposite polarity compared to the main signal path) so that the main signal gets canceled (the power division ratio $S_{32}$ goes down). In some embodiments, path or network 607 includes an inductor 624 and resistor 622 so an opposite polarity is held over a wider bandwidth than a solely resistive path. Therefore, a low power division ratio $|S_{32}/^2$ is maintained over a wider bandwidth in some embodiments.

Figure 9:
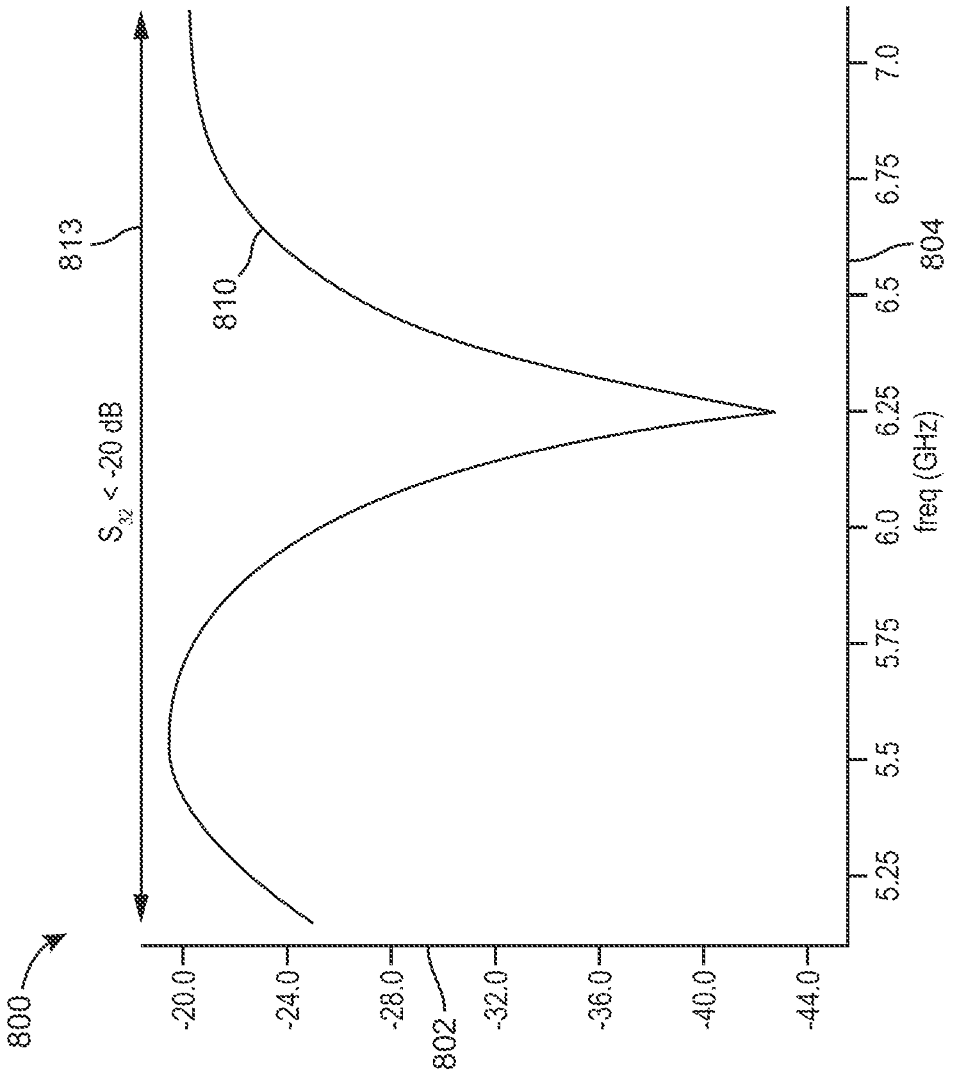
FIG. 9 is a graphical diagram of a response for a divider circuit for use in the radio frequency amplification circuit illustrated in FIG. 1, according to some embodiments.

With reference to FIG. 9, a graph 800 includes an X axis 804 representing frequency and a Y-axis 802 representing power in dB. A curve 810 represents the power divide ratio for ports 2 and 3 (e.g., nodes 605A and 605B). The power divide ratio is less than −20 dB for a bandwidth of 2 GHz. A conventional Wilkinson divider provides an isolation of −20 dB for a bandwidth of 1.5 GHZ.

The capacitance, resistance, and inductance discussed above can be transmission line impedance or parasitic capacitance, resistance, or inductance in some embodiments. T networks or filters (or other transmission line networks employed in various embodiments) can thus be configured to selectively pass an RF signal associated therewith, which may further aid in isolation, both by limiting attenuation of a desired signal, and increasing attenuation of other (e.g., aggressor) signals across the transmission line. For example, any parameter of the T-filter or other transmission line can vary from any other transmission line. For example, selected component values, circuit geometries, or other variances can be configured to effect such parameters. An inductive element may refer to a component that provides an inductive effect in some embodiments. An inductive element can include a discrete inductor, a transmission line with an inductive characteristic, an IC inductor, etc. A capacitive element may refer to a component that provides a capacitive effect in some embodiments. A capacitive element can include a discrete capacitor, a transmission line with a capacitive characteristic, an IC capacitor, etc. A resistive element may refer to a component that provides a resistive effect in some embodiments. A resistive element can include a discrete resistor, a transmission line with a resistive characteristic, an IC resistor, etc.

The circuit 100 can isolate signals, such as signals derived from a same antenna, such that the separate signals can be provided to different ports (e.g., output ports, relative to the amplifier 102) with isolation therebetween. The divider 106 is configured to divide a signal received from an antenna 104 into various constituent signals, each constituent signal configured for provision to a separate amplifier output, which may be connected to any number of devices.

The signals described above can include any number of constituent signals, such as signals of various frequencies, protocols, durations, and the like. A portion of the constituent signals can overlap in frequency or duration, such as in the case of 2.4 GHz Wi-Fi and Bluetooth messages, Wi-Fi messages of overlapping basic service sets, or so forth. The signal can be received from an antenna or antennae and passed through any number of filters, splitters, rectifiers, or other circuitry. A portion of the constituent signals can include content such as symbols mapping to digital information. For example, the received signal can include first content centered about a first frequency (e.g., a first center frequency). The received signal can include second content centered about a second frequency (e.g., a second center frequency).

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., reader elements, writer elements, or magnetic media) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or fluidic. Related to may refer to a mathematical relationship in some embodiments. For example, a value (e.g., of capacitance or inductance) may be related to a power division ratio because it is equal to the power division ratio or exponent thereof multiplied by or divided by another factor.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A power divider device, comprising:

a first node configured to receive a first signal;

a second node configured to provide a second signal;

a third node configured to provide a third signal;

an inductive element coupled between the first node and a power or ground node;

a capacitive element coupled between the first node and a fourth node;

a first T network coupled between the fourth node and the second node; and a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value, wherein the first T network comprises a first inductor having an inductance related to the power division ratio between the first node and the second node and the second T network comprises a second inductor having an inductance related to the power division ratio between the first node and the third node.

2. The power divider device of claim 1, wherein the first T network comprises a third inductor having an inductance related to the power division ratio between the first node and the second node and the second T network comprises a fourth inductor having an inductance related to the power division ratio between the first node and the third node.

3. The power divider device of claim 1, wherein the first T network comprises a third capacitor having capacitance related to the power division ratio between the first node and the second node and the second T network comprises a fourth capacitor having a capacitance related to the power division ratio between the first node and the third node.

4. The power divider device of claim 1, wherein the first inductor has an inductance of $L_2/|S_{21}|^2$ where $L_2$ is an inductance value and $|S_{21}|^2$ is a square of the power division ratio between the first node and the second node.

5. A power divider device, comprising:

a first node configured to receive a first signal;

a second node configured to provide a second signal;

a third node configured to provide a third signal;

an inductive element coupled between the first node and a power or ground node;

a capacitive element coupled between the first node and a fourth node;

a first T network coupled between the fourth node and the second node; and a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value, wherein the first T network comprises a first inductor having an inductance related to the power division ratio between the first node and the second node and the second T network comprises a second inductor having an inductance related to the power division ratio between the first node and the third node, wherein the first T network comprises a third inductor having an inductance related to the power division ratio between the first node and the second node and the second T network comprises a fourth inductor having an inductance related to the power division ratio between the first node and the third node, and wherein the first T network comprises a third capacitor having capacitance related to the power division ratio between the first node and the second node and the second T network comprises a fourth capacitor having an capacitance related to the power division ratio between the first node and the third node.

6. A power divider device, comprising:
a first node configured to receive a first signal;
a second node configured to provide a second signal;
a third node configured to provide a third signal;
an inductive element coupled between the first node and a power or ground node;
a capacitive element coupled between the first node and a fourth node;
a first T network coupled between the fourth node and the second node;
a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value;
a fifth node configured to provide a fourth signal; and
a third T network coupled between the fifth node and the fourth node, wherein the third T network comprises a third capacitor having a capacitance related to a power division ratio between the first node and the fifth node.

7. A power divider device, comprising:
a first node configured to receive a first signal;
a second node configured to provide a second signal;
a third node configured to provide a third signal;
an inductive element coupled between the first node and a power or ground node;
a capacitive element coupled between the first node and a fourth node;
a first T network coupled between the fourth node and the second node; and
a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value,
wherein the first capacitor has a capacitance of $C_2|S_{21}|^2$ where $C_2$ is the first capacitance value and $|S_{21}|^2$ is a s square of the power division ratio between the first node and the second node.

8. A power divider device, comprising:
a first node configured to receive a first signal;
a second node configured to provide a second signal;
a third node configured to provide a third signal;
an inductive element coupled between the first node and a power or ground node;
a capacitive element coupled between the first node and a fourth node;
a first T network coupled between the fourth node and the second node; and
a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value,
wherein an amplifier is coupled to the first node.

9. A power divider device, comprising:
a first node configured to receive a first signal;
a second node configured to provide a second signal;
a third node configured to provide a third signal;
an inductive element coupled between the first node and a power or ground node;
a capacitive element coupled between the first node and a fourth node;
a first T network coupled between the fourth node and the second node; and
a second T network coupled between the third node and the fourth node, wherein the first T network comprises a first capacitor having a capacitance related to a power division ratio between the first node and the second node and a first capacitance value, and the second T network comprises a second capacitor having a capacitance related to a power division ratio between the first node and the third node and the first capacitance value,
wherein the capacitive element has a capacitance of $1/(1/C_1-1/C_2)$ where $C_1$ and $C_2$ are capacitance values derived from an impedance matching network.

10. A power divider device, comprising:
a first node configured to receive a first signal;
a second node configured to provide a second signal;
a third node configured to provide a third signal;
an inductive element coupled between the first node and a power or ground node;
a capacitive element coupled between the first node and a fourth node;
a first network coupled between the fourth node and the second node; and
a second network coupled between the third node and the fourth node, wherein the second node is coupled to a first load and the third node is coupled to a second load, wherein the first load has an impedance related to a power division ratio between the first node and the second node and a first impedance value, and the second load has an impedance related to a power division ratio between the first node and the third node and the first impedance value,
wherein the first network comprises a first inductor having an inductance related to the power division ratio between the first node and the second node and the second network comprises a second inductor having an inductance related to the power division ratio between the first node and the third node.

11. The power divider device of claim 10, wherein a circuit is provided between the second node and the third node.

12. The power divider device of claim 11, wherein the circuit comprises an inductor and a capacitor.

13. The power divider device of claim 12, wherein the inductor and the capacitor are in series.

14. The power divider device of claim 10, wherein the first network comprises a third inductor having an inductance related to the power division ratio between the first node and the second node and the second network comprises a fourth inductor having an inductance related to the power division ratio between the first node and the third node.

15. The power divider device of claim 10, wherein the first network comprises a first capacitor having a capacitance related to the power division ratio between the first node and the second node and the second network comprises a second capacitor having a capacitance related to the power division ratio between the first node and the third node, and wherein the first network comprises a third capacitor having capacitance related to the power division ratio between the first node and the second node and the second network comprises a fourth capacitor having an capacitance related to the power division ratio between the first node and the third node.

16. The power divider device of claim 10, further comprising:

a fifth node configured to provide a third signal;

wherein the fifth node is coupled to a third load, wherein the third load has an impedance related to a power division ratio between the first node and the fifth node.

17. A method comprising:

receiving at a first node a first signal;

providing the first signal to a second node, wherein the second node is coupled to a first network, the first network comprising a first capacitor and a first inductor, the first capacitor being between the first node and the second node;

providing a second signal from a second network to a third node, the second network being coupled to the first capacitor and the third node, the second network comprising a second capacitor and a third capacitor coupled in series and a second inductor coupled between the second capacitor and the third capacitor;

providing a third signal from a third network to a fourth node, the third network being coupled to the first capacitor and the fourth node, the third network comprising a fourth capacitor and a fifth capacitor coupled in series and a third inductor coupled between the fourth capacitor and the fifth capacitor, wherein the second inductor has an inductance related to a power division ratio between the first node and the second node and a first impedance value, and the third inductor has an inductance related to a power division ratio between the first node and the third node and the first impedance value; and providing a fourth signal across a path between the second node and the third node, the path being an inductive and resistive path.

* * * * *